United States Patent [19]

Smits et al.

[11] Patent Number: 4,746,520

[45] Date of Patent: May 24, 1988

[54] SWEETENING PRODUCT, METHOD FOR THE MANUFACTURING THEREOF AND PLANT FOR THE WORKING OF THIS METHOD

[75] Inventors: Georges J. Smits, Gijzegem; Andre H. Bausier, Jodoigne, both of Belgium

[73] Assignee: Raffinerie Tirlemontoise, Societe Anonyme, Brussels, Belgium

[21] Appl. No.: 860,180

[22] Filed: May 6, 1986

[30] Foreign Application Priority Data

May 6, 1985 [BE] Belgium ................................ 214966

[51] Int. Cl.[4] .............................................. A23L 1/236

[52] U.S. Cl. .................................... 426/103; 426/658; 426/804

[58] Field of Search ................ 426/658, 540, 103, 804, 426/548

[56] References Cited

U.S. PATENT DOCUMENTS

| | | | |
|---|---|---|---|
| 3,647,483 | 3/1972 | Eisenstadt | 426/548 |
| 3,653,922 | 4/1972 | Schmitt | 426/548 |
| 3,780,190 | 12/1973 | Kracauer | 426/548 |
| 3,922,369 | 11/1975 | Glicksman | 426/548 |
| 4,085,232 | 4/1978 | Eisenstadt | 426/548 |
| 4,158,068 | 6/1979 | Lipinski | 426/548 |
| 4,254,154 | 3/1981 | Eisenstadt | 426/548 |

FOREIGN PATENT DOCUMENTS

| | | |
|---|---|---|
| 0058410 | 2/1982 | European Pat. Off. . |
| 70408 | 2/1891 | Fed. Rep. of Germany . |
| 2081997 | 12/1971 | France . |
| 2295706 | 12/1975 | France . |
| 2355461 | 6/1977 | France . |
| 84363 | 9/1982 | Luxembourg . |
| 388221 | 6/1965 | Switzerland . |

*Primary Examiner*—Jeanette Hunter

*Attorney, Agent, or Firm*—Cushman, Darby & Cushman

[57] ABSTRACT

The sweetening product is comprised of a mixture comprising by weight, 94 to 96.5% sugar and/or sugar-derived polyalcohol, 3 to 5.5% sweetener or sweetener mixture with high sweetening power, 0.1 to 0.4% food organic acid, such as citric acid, 0.2 to 0.5% bicarbonate, such as sodium bicarbonate, and such an amount water that the end product does contain at the most 0.1 weight % water. There is further described a method for manufacturing such a product.

12 Claims, 1 Drawing Sheet

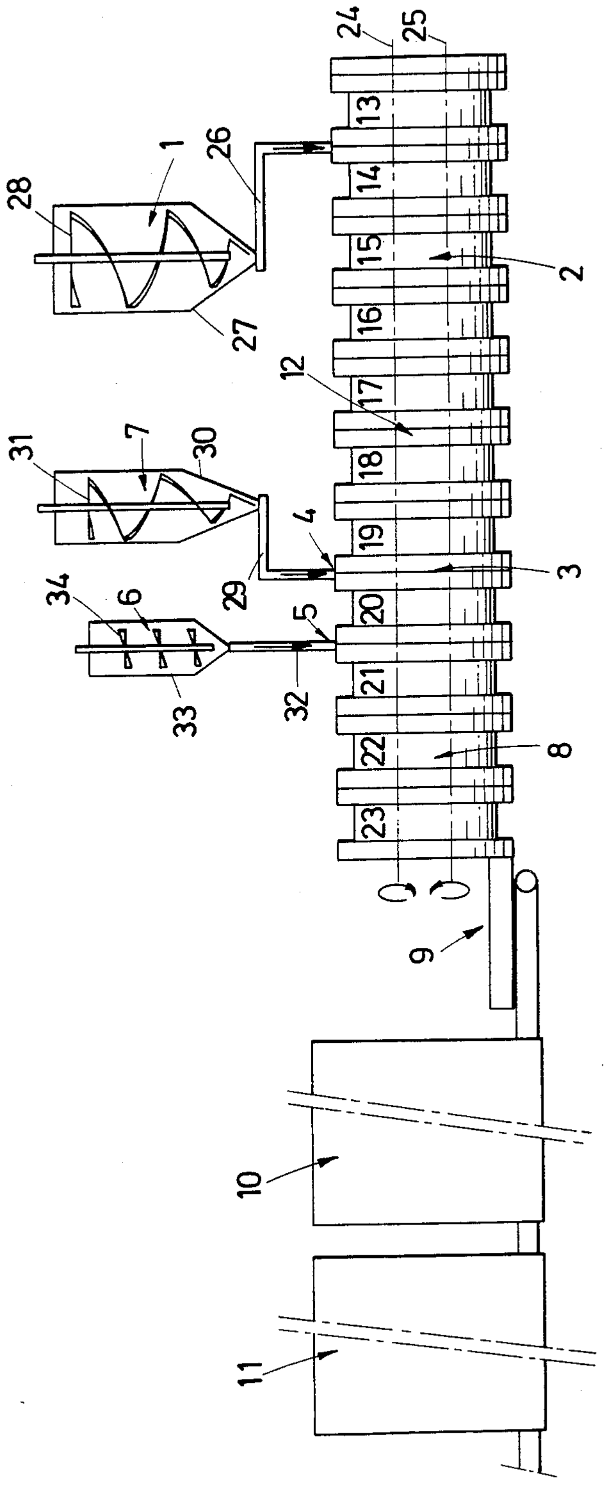
1
2
3
4
5
6
7
8
9
10
11
12
13
14
15
16
17
18
19
20
21
22
23
24
25
26
27
28
29
30
31
32
33
34

SWEETENING PRODUCT, METHOD FOR THE MANUFACTURING THEREOF AND PLANT FOR THE WORKING OF THIS METHOD

This invention has for object a sweetening product which for an equal sweetening power, has for advantage to have a much lower energizing power than the sugars, while further having the advantage of providing substantially the same organoleptic properties as such sugars, that is said sweetening product does not leave the unpleasant after-taste of the known sweeteners with a high sweetening power.

For this purpose according to the invention, the sweetening product is comprised of a mixture comprising by weight, 94 to 96.5% sugar and/or sugar-derived polyalcohol, 3 to 5.5% sweetener or sweetener mixture with high sweetening power, 0.1 to 0.4% food organic acid, such as citric acid, 0.2 to 0.5% bicarbonate, such as sodium bicarbonate, and such a water amount that the end product contains at the most 0.1 weight % water.

In an advantageous embodiment of the invention, the product is in the shape of white hard aerated lumps with a density in the range from 0.3 to 0.7. This sweetening product consequently has the shape and the appearance of the usual saccharose lumps with high energizing power, which provides a not unimportant advantage relative to the sweeteners which are generally offered in the shape of drops, medicine-like tablets, or powders.

The invention has further for object a method for the manufacturing of said sweetening product.

According to the invention, said method comprises to obtain the sweetening product in the shape of white hard aerated lumps, dissolving the sweetener in water, mixing said solution with the sugar, the water amount being so selected as to have the mixture comprise 80 to 88% dry materials, dissolving said mixture at a temperature between 150° and 220° C., evaporating and controlling said concentrating in such a way as to lower the temperature, adding thereto when the temperature is lower than 130° C., the food organic acid and the bicarbonate, working everything thoroughly together under a pressure substantially equal to the atmospheric pressure, moulding the resulting paste by letting same flow freely into moulds which have been pre-heated to a temperature about 80° C., removing the excess paste from the moulds, rapidly drying the moulds and the contents thereof, stripping the moulds from the formed and partly-dried lumps, and finally drying completely the lumps at a temperature between 30° and 35° C.

The invention has finally for object a plant for the working of said method.

Other details and features of the invention will stand out from the following description, given by way of non limitative example and with reference to the accompanying drawing.

The single FIGURE shows a diagrammatic elevation view with parts broken away, showing said method and plant.

The sweetening product according to the invention, is comprised of a mixture of sugar such as saccharose, and a sweetener with high sweetening power. As the sweetening power of said latter product is often 150 to 300 times higher, for an equal weight, than saccharose and the energizing power thereof is substantially zero, the resulting sweetening product has for the same sweetening power, an energizing value which is lower by 80 to 85% than saccharose.

A sweetener which gives particularly good results, in combination with saccharose, is an artificial sweetener comprised of potassium acesulfame from the Hoechst Company, known by the name Acesulfame K.

To give to said sweetening product, for example in powdered form, a taste which is subatantially identical to conventional sugar, said mixture comprises by weight, from 94% to 96.5% saccharose.

Said mixture comprises to allow obtaining a sweetening product which has the bulky and somewhat aerated appearance of the conventional saccharose lumps, from 94 to 96.5 weight % saccharose, 3 to 5.5 weight % potassium acesulfame, 0.3 weight % food organic acid, 0.4 weight % bicarbonate, and such an amount water that the end product does contain at the most 0.1 weight % water. Said mixture allows obtaining an end sweetening product with a density between 0.6 and 0.7, the lumps of which to have the same sweetening power as the conventional sugars, have a weight between 0.6 and 1.1 g, a volume in the range from 1 to 1.5 $cm^3$, a pH in solution varying between 6 and 7, the energizing power of each said lumps lying in the range from 2 to 4 kcal.

The method for obtaining the sweetening product in the shape of white hard aerated lumps, comprises dissolving in water the potassium acesulfame the weight percentage of which in said mixture, lies between 3% and 5.5%. There is mixed with said solution, in 1, the saccharose the granulometry of which lies between 0.22 and 0.50 mm, and which is preferably refined saccharose. The amount water is so selected as to obtain 80% to 88% dry materials. The saccharose and potassium acesulfame are dissolved in 2, at a temperature from 150° to 220° C. There is then evaporated, in 3, a substantial amount water from the mixture, under atmospheric pressure, to obtain a dry material content from 87% to 96%. Such concentrating is so controlled as to bring the temperature below 130° C. before adding to the solution, in 4 and 5, the food organic acid and the bicarbonate. It is imperative to neutralize as fast as possible the mixture after adding said acid and bicarbonate, to prevent colouring and/or inverting the saccharose. The organic acid, for example citric acid, is first brought into solution, in 6, in water until a solution is obtained the concentration of which by weight, is 50% and the pH is 0.5. The bicarbonate is pre-mixed, in 7, with very fine refined saccharose. The ratio bicarbonate/saccharose may vary depending on the amount sugar being required for granulating the mass after evaporating.

To produce 1 l carbonic gas per kg saccharose, there must be added, as dry material, 2.86 g citric acid and 3.75 g sodium bicarbonate per kg saccharose. From this method stage on, the temperature should remain lower than 130° C. The mixing of acid and bicarbonate in the sweetening product mass should be very thorough, in 8, to suitably distribute the carbonic gas, and the gas bubbles may not be larger than 1 mm in diameter as otherwise they might escape from the mass before hardening thereof. The sweetening product mass has the form of a viscous paste wherein the reaction between the citric acid and bicarbonate should go on for some time to obtain the aerated structure. For this reason, the sweetening product mass should be poured, in 9, into moulds which have been pre-heated to 80° C. and the design of which is such that the sweetening product flows therein without any resistance to avoid breaking the bubble structure. After casting, the moulds move through a fast-drying tunnel 10 and the excess sweetening product is removed therefrom. After stripping the moulds away, the lumps finally pass through a drying tunnel 11 the inner temperature of which is 30° to 35° C. to avoid colouring the product. There is thus obtained lumps of white sweetening product the volume of which is about 1 to 1.5 $cm^3$, the density of which lies between 0.6 and 0.7, the pH in solution of which varies between 6 and 7, and the energizing power of which is 2 to 4 Kcal, that is a lump the energizing power of which is 80 to 85% lower than a conventional saccharose lump from 4 to 6.25 g, and this with the same sweetening power.

The plant as shown in the drawing is essentially comprised of an extruder-cooker 12 which performs continuously the steps from said method, that is mixing the components, heating the mixture, partly evaporating the water thereof, and allowing those mixture changes which result from the chemical and physical reactions of the components relative to one another. Said extruder 12 is comprised of eleven lined-up chambers 13 to 23, wherein two parallel worm-screws are arranged, as shown diagrammatically with the axes 24 and 25 thereof, which are driven in opposite directions by a motor not shown. Said extruder is of that type known under the name "CONTINUA" manufactured by the firm WERNER and PFLEIDERER, and the length/diameter ratio thereof is about 33, the eleven chambers being equal and having a length/diameter ratio equal to 3. Both screws 24 and 25 are so arranged as to have the pressure inside the extruder remain substantially equal to the atmospheric pressure. Heating means are arranged to raise the inner temperature of chambers 14 to 16 progressively from the room temperature up to 150° C. to 200° C., for the chambers 17 and 18 from 160° C. to 250° C. The chambers 19 and 20 which are open to allow evaporating, are not heated, while the heating means for chambers 21 to 23 are so designed as to raise the inner temperature thereof up to 90° C. to 110° C. The screws 24 and 25 are moreover so designed as to insure propelling the components from chamber 13 to chamber 20 and moreover, besides the conveying, to mix thouroughly the components from chamber 21 up to chamber 23. The revolution rate of the screws is varying and may lie between 35 and 100 RPM depending on the product amounts to be manufactured, said amounts being for both above revolution rates, 50 and 100 kg/hour. The mixture or blend of saccharose-artificial sweetener/water solution is fed in the extruder between chambers 13 and 14, through a pipe 26 connected to a hopper 27 provided with a mixing screw 28. The saccharose/bicarbonate mixture is fed in the extruder between chambers 19 and 20, through a pipe 29 connected to a hopper 30 provided with a mixing screw 31. Finally the solution of food organic acid is injected in the extruder between chambers 20 and 21, through a pipe 32 connected to a hopper 33 provided with a stirrer 34.

It must be understood that the invention is in no way limited to the above embodiment and that many changes may be brought thereto without departing from the scope of the invention as defined by the appended claims.

We claim:

1. A sweetening product comprising by weight, 94 to 96.5% sugar, sugar-derived alcohol or mixtures thereof; 3 to 5.5% of an artificial sweetener or sweetening mixture with high sweetening power, 0.1 to 0.4% food organic acid, 0.2 to 0.5% bicarbonate, and such a water amount that the end product contains at the most 0.1 weight % water.

2. Sweetening product as defined in claim 1, in which the sugar being used is saccharose and the sweetener is comprised of potassium acesulfame, known by the name Acesulfame K.

3. Sweetening product as defined in claim 1, which is provided in the shape of white hard aerated lumps, with a density in the range from 0.3 to 0.7.

4. Sweetening product as defined in claim 3, in which the lump weight lies between 0.6 and 1.1 g, for a volume in the range from 1 to 1.5 $cm^3$, and with an energizing power in the range from 2 to 4 Kcal.

5. Sweetening product as defined in claim 1, in which the pH in solution varies between 6 and 7.

6. A method for manufacturing a white hard aerated sweetening product in the form of lumps as defined in any one of claims 3 to 5 comprising dissolving the sweetener in water, mixing said solution with the sugar, the water amount being so selected as to have the mixture comprise 80 to 88% dry materials, dissolving said mixture at a temperature lying between 150° and 220° C., concentrating said mixture by evaporating while controlling said evaporating so as to lower the temperature, adding said organic food acid and bicarbonate when the temperature is less than 130° C., thoroughly mixing under pressure substantially equal to the atmospheric pressure, moulding the resulting paste by letting same flow freely into moulds which have been preheated to a temperature about 80° C., removing the excess paste from the moulds, rapidly drying the moulds and the contents thereof, stripping the moulds from the formed and partly-dried lumps, and finally drying said lumps at a temperature between 30° and 35° C.

7. Method as defined in claim 6, which further comprises evaporating the water contained in said mixture to obtain a dry material content lying between 87 and 96%, wherein said organic food acid is added as a solution of 50% by weight in an amount to provide a pH of about 5 and where in the sodium bicarbonate is mixed with sugar.

8. Method as defined in claim 7, wherein the citric acid solution and sodium bicarbonate mixture are metered so as to form about one liter carbonic gas for one kg saccharose.

9. Method as defined in claim 6 wherein the sugar is refined saccharose with a granulometry (MA) lying between 0.20 and 0.50 mm, wherein the bicarbonate is mixed with very refined saccharose.

10. Method as defined in claim 9, wherein said citric acid is in an amount of 2.8 of per kg of saccharose and said sodium bicarbonate in an amount of 3.7 g per kg of saccharose.

11. A sweetening product as in claim 1 wherein said food organic acid is citric acid and wherein said bicarbonate is sodium bicarbonate.

12. A sweetening product as in claim 1 wherein said artificial sweetener is 150–300 times sweeter than an equal weight of saccharose and has substantially no calories.

* * * * *